US012531710B2

United States Patent
Li et al.

(10) Patent No.: US 12,531,710 B2
(45) Date of Patent: Jan. 20, 2026

(54) SIMULTANEOUS MULTIPLE SECONDARY CELL (SCell) FAST ACTIVATION

(71) Applicant: Apple Inc., Cupertino, CA (US)

(72) Inventors: Qiming Li, Beijing (CN); Yang Tang, San Jose, CA (US); Manasa Raghavan, Sunnyvale, CA (US); Dawei Zhang, Saratoga, CA (US); Xiang Chen, Campbell, CA (US); Yushu Zhang, Beijing (CN); Jie Cui, Santa Clara, CA (US); Hong He, San Jose, CA (US)

(73) Assignee: Apple Inc., Cupertino, CA (US)

( * ) Notice: Subject to any disclaimer, the term of this patent is extended or adjusted under 35 U.S.C. 154(b) by 435 days.

(21) Appl. No.: 18/101,350

(22) Filed: Jan. 25, 2023

(65) Prior Publication Data

US 2023/0344591 A1 Oct. 26, 2023

Related U.S. Application Data

(60) Provisional application No. 63/334,499, filed on Apr. 25, 2022.

(51) Int. Cl.
*H04L 5/00* (2006.01)
*H04W 72/23* (2023.01)

(52) U.S. Cl.
CPC .......... *H04L 5/0098* (2013.01); *H04W 72/23* (2023.01)

(58) Field of Classification Search
CPC ............ H04L 5/0098; H04W 72/23–232
See application file for complete search history.

(56) References Cited

U.S. PATENT DOCUMENTS

| 2021/0067288 A1* | 3/2021 | Kakishima | ............ H04L 1/0031 |
| 2022/0116896 A1* | 4/2022 | Takeda | ................ H04W 56/001 |
| 2024/0195566 A1* | 6/2024 | Ohara | .................... H04W 76/15 |

OTHER PUBLICATIONS

3GPP TS 38.101-1 V17.4.0 (Dec. 2021), 3rd Generation Partnership Project; Technical Specification Group Radio Access Network; NR; User Equipment (UE) radio transmission and reception; Part 1: Range 1 Standalone (Release 17); 626 pages.
3GPP TS 38.133 V17.4.0 (Dec. 2021), 3rd Generation Partnership Project; Technical Specification Group Radio Access Network; NR; Requirements for support of radio resource management (Release 17); 3230 pages.

(Continued)

*Primary Examiner* — Kevin C. Harper
(74) *Attorney, Agent, or Firm* — Sterne, Kessler, Goldstein & Fox P.L.L.C.

(57) ABSTRACT

Some embodiments include an apparatus, method, and computer program product for simultaneous multiple secondary cell (SCell) fast activation in a wireless communications system. Some embodiments include a user equipment (UE) that can simultaneously activate multiple SCells. In some embodiments, after receiving an activation command, the UE can receive two or more temporary reference signals (T-RSs) which are user equipment (UE) specific reference signals. The UE can use the T-RSs for fine time/frequency (T/F) tracking and Automatic Gain Control (AGC) adjustment of corresponding SCells resulting in reduced SCell activation latency compared to utilizing a Synchronization Signal (SS)/Physical Broadcast Channel (PBCH) Block Measurement Timing Configuration (SMTC).

20 Claims, 8 Drawing Sheets

(56) References Cited

OTHER PUBLICATIONS

3GPP TS 38.306 V16.7.0 (Dec. 2021), 3rd Generation Partnership Project; Technical Specification Group Radio Access Network; NR; User Equipment (UE) radio access capabilities (Release 16); 156 pages.

\* cited by examiner

SIMULTANEOUS MULTIPLE SECONDARY CELL (SCell) FAST ACTIVATION

CROSS-REFERENCE TO RELATED APPLICATION

This application claims benefit of U.S. Provisional Patent Application No. 63/334,499, filed on Apr. 25, 2022, which is incorporated herein by reference in its entirety.

BACKGROUND

Field

The described embodiments relate generally to simultaneous multiple secondary cell (SCell) fast activation in a wireless communications system.

Related Art

Wireless communications systems support secondary cell (SCell) fast activation in a wireless communications system between a base station (BS) and a communications device such as a user equipment (UE).

SUMMARY

Some embodiments include a system, apparatus, article of manufacture, method, and/or computer program product and/or combinations and sub-combinations thereof, for simultaneous multiple secondary cell (SCell) fast activation in a wireless communications system. Some embodiments include a user equipment (UE), that can receive an activation command, and then receive a first group of X temporary reference signals (T-RSs) within a first window length (Tw) where X is an integer, where the first group of X T-RSs are specific to the UE. The UE can activate a first group of SCells, where a first SCell of the first group of SCells corresponds respectively to a first T-RS of the first group of X T-RSs. In some embodiments, the first Tw corresponds to a multiple of slots. In some examples, the multiple of slots corresponds to 2 slots.

Subsequent to the first Tw and a first gap period, $T_{gap1}$, the UE can receive (Y–X) T-RSs that are specific to the UE within a second Tw, where Y is an integer greater than X and where (Y–X) is less than X. The UE can activate a second group of SCells, where one SCell of the second group of SCells corresponds to one T-RS of the (Y–X) T-RSs, where the second group of SCells is different from the first group of SCells.

In some embodiments, the activation time, $T_{activation}$, for activating the first and the second group of SCells includes a $T_{FirstTRS}$, the $T_{gap1}$, the second Tw, a $T_{SecondTRS}$, a $T_{gap2}$, and a third Tw, where the $T_{FirstTRS}$ includes a time after the activation command is received to the end of the first Tw. In some examples, the UE can simultaneously activate a subset of SCells of the first group of SCells before remaining SCells of the first group of SCells, and report first valid channel quality indicators (CQIs) corresponding to the subset of SCells before reporting second valid CQIs corresponding to the remaining SCells of the first group of SCells. To activate the first group of SCells, the UE can receive a second group of X T-RSs within a third Tw, where the second group of X T-RSs corresponds to the first group of SCells. The UE can perform one or more automatic gain control (AGC) adjustments based at least on the second group of X T-RSs. In some examples, the activating the first group of SCells includes performing fine Time/Frequency (T/F) tracking based at least on the X T-RSs.

In some embodiments, the UE includes a parameter, maxTFtrackAGCforSCells that corresponds to the X T-RSs that can be received within the first Tw. In some examples, subsequent to the first Tw and a first gap period, $T_{gap1}$, the UE can receive (Y–X) T-RSs that are specific to the UE within a second Tw, where Y is an integer greater than X and less than or equal to 2X. The UE can activate a second group of SCells, where one SCell of the second group of SCells corresponds to one T-RS of the (Y–X) T-RSs, where the second group of SCells is different from the first group of SCells.

In some examples, $T_{activation}$, for activating the first and the second group of SCells includes a $T_{FirstTRS}$, the $T_{gap1}$, and the second Tw, where the $T_{FirstTRS}$ includes a time after the activation command is received to the end of the first Tw. In some embodiments, the UE can simultaneously activate a subset of SCells of the second group of SCells before remaining SCells of the second group of SCells. The UE can report first valid CQIs corresponding to the subset of SCells before reporting second valid CQIs corresponding to the remaining SCells of the second group of SCells.

BRIEF DESCRIPTION OF THE FIGURES

The accompanying drawings, which are incorporated herein and form part of the specification, illustrate the presented disclosure and, together with the description, further serve to explain the principles of the disclosure and enable a person of skill in the relevant art(s) to make and use the disclosure.

Figure 1:
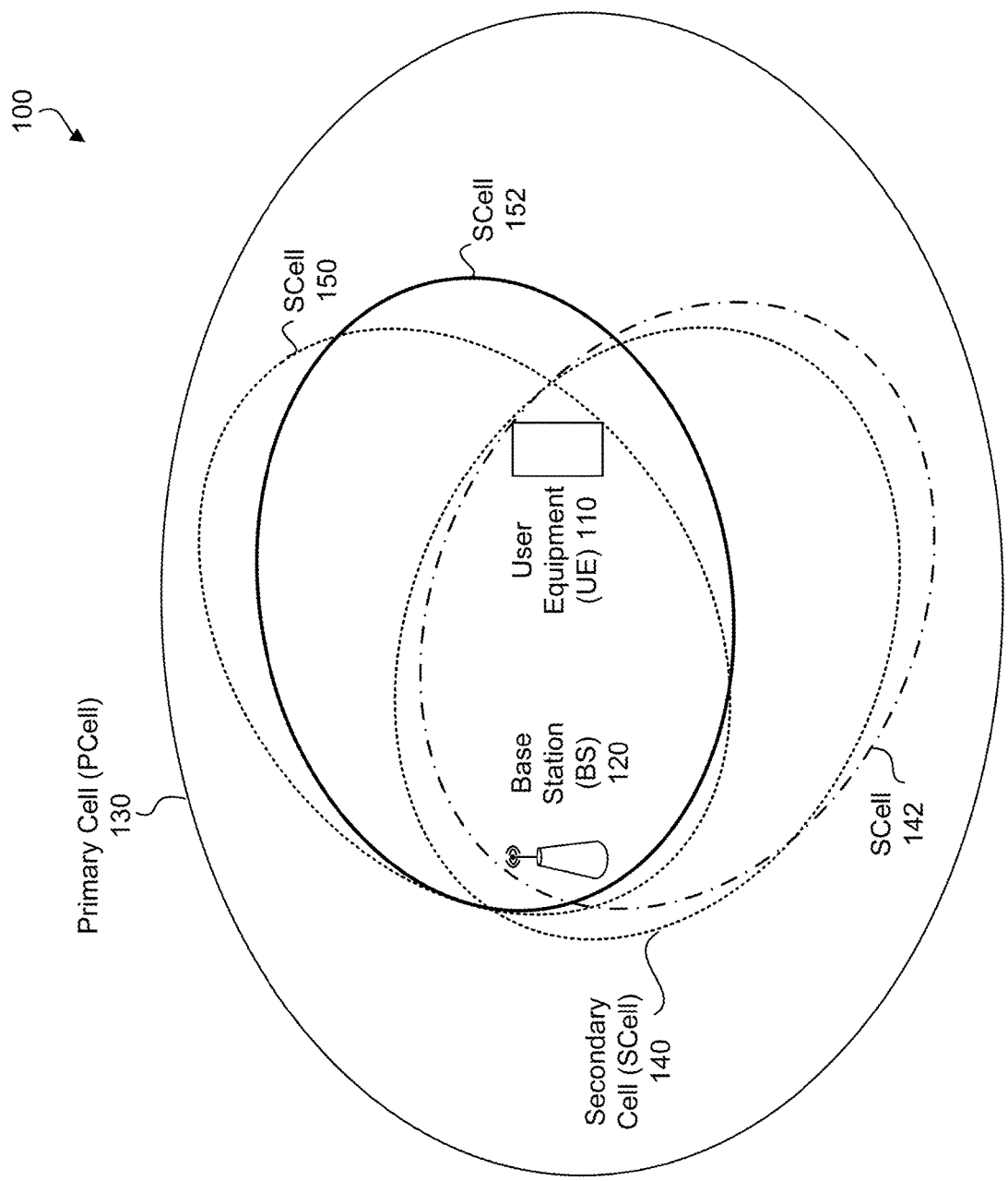
FIG. 1 illustrates an example system for simultaneous multiple secondary cell (SCell) fast activation, in accordance with some embodiments of the disclosure.

The presented disclosure is described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

Some embodiments include a system, apparatus, article of manufacture, method, and/or computer program product and/or combinations and sub-combinations thereof, for simultaneous multiple secondary cell (SCell) fast activation. Synchronization Signal Block (SSB) in SSB-based Measurement Timing Configuration (SMTC) is a cell specific periodic reference signal. The SMTC range is from 5 ms to 160 ms. In legacy SCell activation, after receiving activation command, a UE needs to wait for the next one or two SMTC for fine Time/Frequency (T/F) tracking and Automatic Gain Control (AGC) adjustment. In fast SCell activation, after transmitting an activation command a wireless network can transmit a temporary reference signal (T-RS), a UE specific reference signal. The UE can then perform T/F tracking and AGC adjustment immediately after receiving the activation command. Due to a process limitation, a UE cannot perform T/F tracking and AGC simultaneously on multiple SCells. Some embodiments include a new UE capability that identifies a maximum number of SCells for which a UE can support using T-RS for fine T/F tracking and AGC adjustments (e.g., simultaneously), where the embodiments enable simultaneous multiple SCell activations faster than relying on SMTCs.

FIG. 1 illustrates an example system 100 for simultaneous multiple SCell fast activation, in accordance with some embodiments of the disclosure. System 100 includes user equipment (UE) 110, base station (BS) 120, Primary Cell (PCell) 130 and SCell 140, 142, 150, and 152. UE 110 may be a computing electronic device such as a smart phone, cellular phone, and for simplicity purposes—may include other computing devices including but not limited to laptops, desktops, tablets, personal assistants, routers, monitors, televisions, printers, and appliances. BS 120 can include but is not limited to a wireless base station, an enhanced node BS (eNB), a fifth generation new radio BS (gNB), or a transmission and reception point (TRP) of a wireless network.

For example, BS 120 can transmit an activation command via a PCell transmission to UE 110 for activating an SCell. In some embodiments, UE 110 can support X simultaneous multiple SCell fast activations where X is an integer. For example, in system 100 where X=3, UE 110 can identify a maximum number of 3 SCells (e.g., SCell 140, 142, 150) for which UE 110 can perform simultaneous multiple SCell fast activation. UE 110 can receive up to 3 T-RSs received during a window length (Tw) for performing fine T/F tracking and AGC adjustments simultaneously. A T-RS can be an aperiodic, UE specific reference signal. After a guard period, $T_{guard}$, during which UE 110 processes the 3 T-RSs received during Tw, UE 110 can receive a $4^{th}$ T-RS during a second Tw, where the $4^{th}$ T-RS corresponds to SCell 152. UE 110 can use the $4^{th}$ T-RS for performing fine T/F tracking and AGC adjustments to activate SCell 152.

In some embodiments, an SCell can be supported by a BS (not shown) that is different than BS 120, or a remote radio head.

Figure 2:
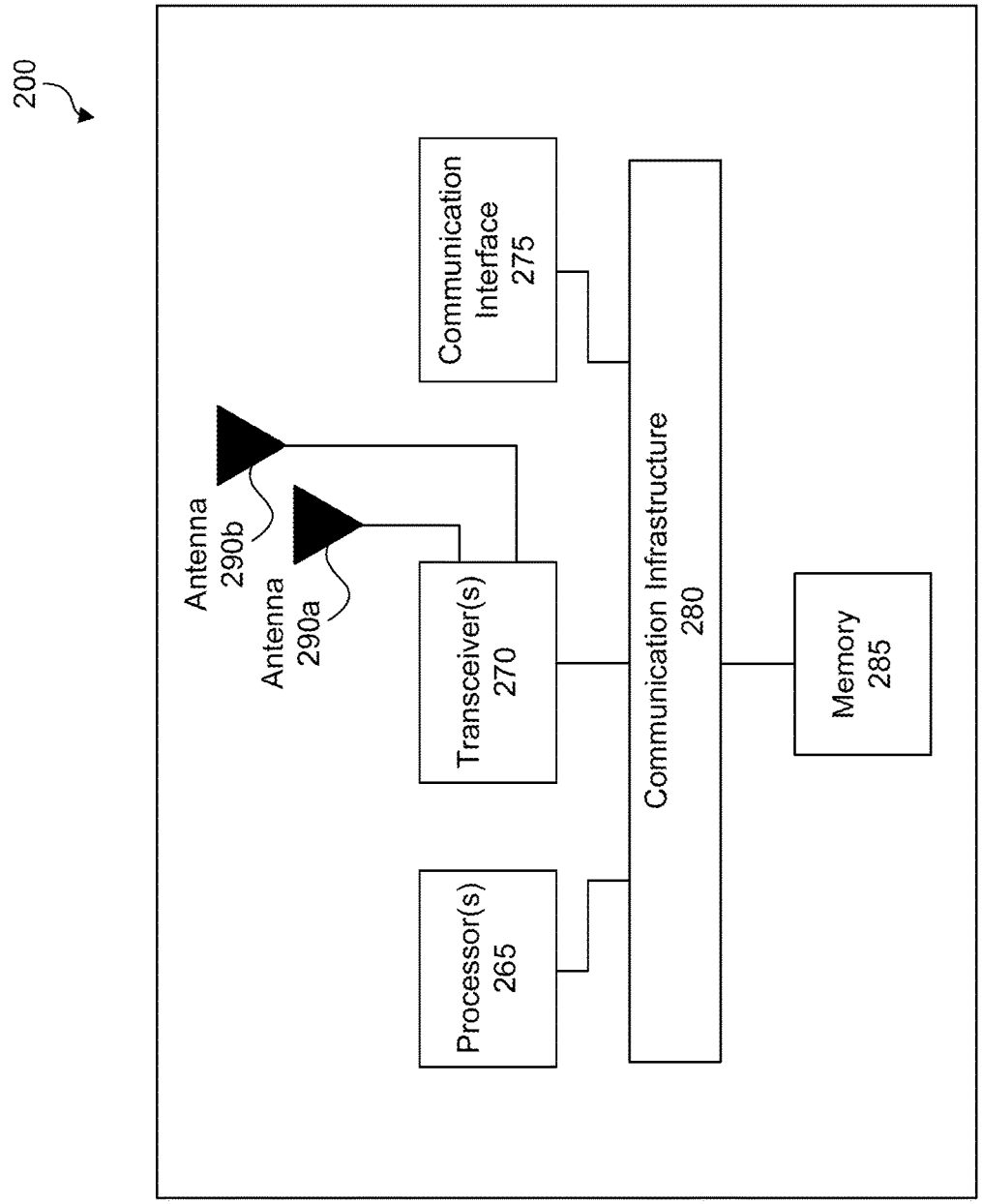
FIG. 2 illustrates a block diagram of an example wireless system for simultaneous multiple SCell fast activation, according to some embodiments of the disclosure.

FIG. 2 illustrates a block diagram of an example wireless system 200 supporting simultaneous multiple SCell fast activation, according to some embodiments of the disclosure. For explanation purposes and not a limitation, FIG. 2 may be described with reference to elements from FIG. 1. For example, system 200 may be any of the electronic devices: UE 110 or BS 120 of system 100. System 200 includes one or more processors 265, transceiver(s) 270, communication interface 275, communication infrastructure 280, memory 285, and antenna 290. Memory 285 may include random access memory (RAM) and/or cache, and may include control logic (e.g., computer instructions) and/ or data. One or more processors 265 can execute the instructions stored in memory 285 to perform operations enabling wireless system 200 to transmit and receive wireless communications supporting simultaneous multiple SCell fast activation described herein. In some embodiments, one or more processors 265 can be "hard coded" to perform the functions herein. Transceiver(s) 270 transmits and receives wireless communications signals including wireless communications supporting simultaneous multiple SCell fast activation according to some embodiments, and may be coupled to one or more antennas 290 (e.g., 290a, 290b). In some embodiments, a transceiver 270a (not shown) may be coupled to antenna 290a and different transceiver 270b (not shown) can be coupled to antenna 290b. Communication interface 275 allows system 200 to communicate with other devices that may be wired and/or wireless. Communication infrastructure 280 may be a bus. Antenna 290 may include one or more antennas that may be the same or different types.

In some embodiments, UE 110 can include a parameter that identifies the number of SCells for which UE 110 can support using T-RS for fine T/F tracking and AGC adjustments simultaneously. As an example, a physical layer parameter, maxTFtrackAGCforSCells=X, where X is an integer greater than or equal to 2 may be defined in 3GPP TS38.306, section 4.2.7.10. Simultaneously can mean that the T-RS for different SCells are transmitted within a window length, Tw, which may be defined in 3GPP TS38.133. In some examples the window length, Tw, is based on multiple slots (e.g., 2 ms/2 slots.) In some embodiments the window length, Tw, varies based on a subcarrier spacing (e.g., 15 kHz: 2 slots or 2 ms, 30 kHz: 1 slot or 1 ms.) An example of the physical layer parameters is shown below in Table 1.

TABLE 1

Physical Layer Parameters

| Definitions for parameters | Per | M | FDD-TDD DIFF | FR1-FR2 DIFF |
|---|---|---|---|---|
| absoluteTPC-Command Indicates whether the UE supports absolute TPC command mode. | UE | No | No | Yes |
| aggregationFactorSPS-DL-r16 Indicates whether the UE supports configurable PDSCH aggregation factor ({1, 2, 4, 8}) per DL SPS configuration. The UE can include this feature only if the UE indicates supports of downlinkSPS. | UE | No | No | Yes |
| almostContiguousCP-OFDM-UL Indicates whether the UE supports almost contiguous UL CP-OFDM transmissions as defined in clause 6.2 of TS 38.101-1 [2]. | UE | No | No | Yes |
| bwp-SwitchingDelay Defines whether the UE supports DCI and timer based active BWP switching delay type1 or type2 specified in clause 8.6.2 of TS 38.133 [5]. It is mandatory to report type 1 or type 2. This capability is not applicable to IAB-MT. | UE | Yes | No | No |
| maxTFtrackAGCforSCells The number of SCells for which UE can support using T-RS for T/F tracking and AGC simultaneously. | UE | No | No | No |

Regarding the title headers, Per identifies an element (e.g., UE) that supports the feature. Per UE indicates that the feature applies for all frequency bands which the UE supports. M indicates whether the feature is mandatory or not. FDD-TDD DIFF indicates whether the support of the feature needs to be indicated differently for FDD and TDD. FR1-FR2 DIFF indicates whether the support of the feature needs to be indicated differently for FR1 and FR2.

In some embodiments, T-RS are used for fast activation for all target SCells. In an example, when activating Y SCells where Y>X where X and Y are integers, a network can transmit via BS 120, X T-RSs corresponding to X SCells within a window length, Tw. For the remaining (Y−X) SCells, the network can transmit corresponding (Y−X) T-RSs after the Tw plus a guard period (e.g., $T_{guard}$). During $T_{guard}$, UE 110 can process the X T-RS transmitted in Tw, 2 ms/2 slots. Note that the network ensures that (Y−X)<=X. Otherwise, the network may further split (Y−X) into smaller groups.

In some embodiments, UE 110 can perform fine T/F tracking and AGC adjustments based on the received T-RSs corresponding to SCells by SCell group. In other words, UE 110 can perform fine T/F tracking and AGC adjustments based on up to X T-RSs received corresponding to X SCells at a time. In some examples, UE 110 can simultaneously perform fine T/F tracking and AGC adjustments based on up to X T-RSs received corresponding to X SCells. In some examples, UE 110 can complete activation for some SCells (e.g., a subset of the X SCells) earlier than other SCells (e.g., the remaining SCells of the X SCells). Thus, UE 110 can report valid Channel Quality Indicators (CQI) for the corresponding subset of the X SCells so that the network can timely schedule the subset of the X SCells (e.g., earlier than the remaining SCells of the X SCells).

Figure 3:
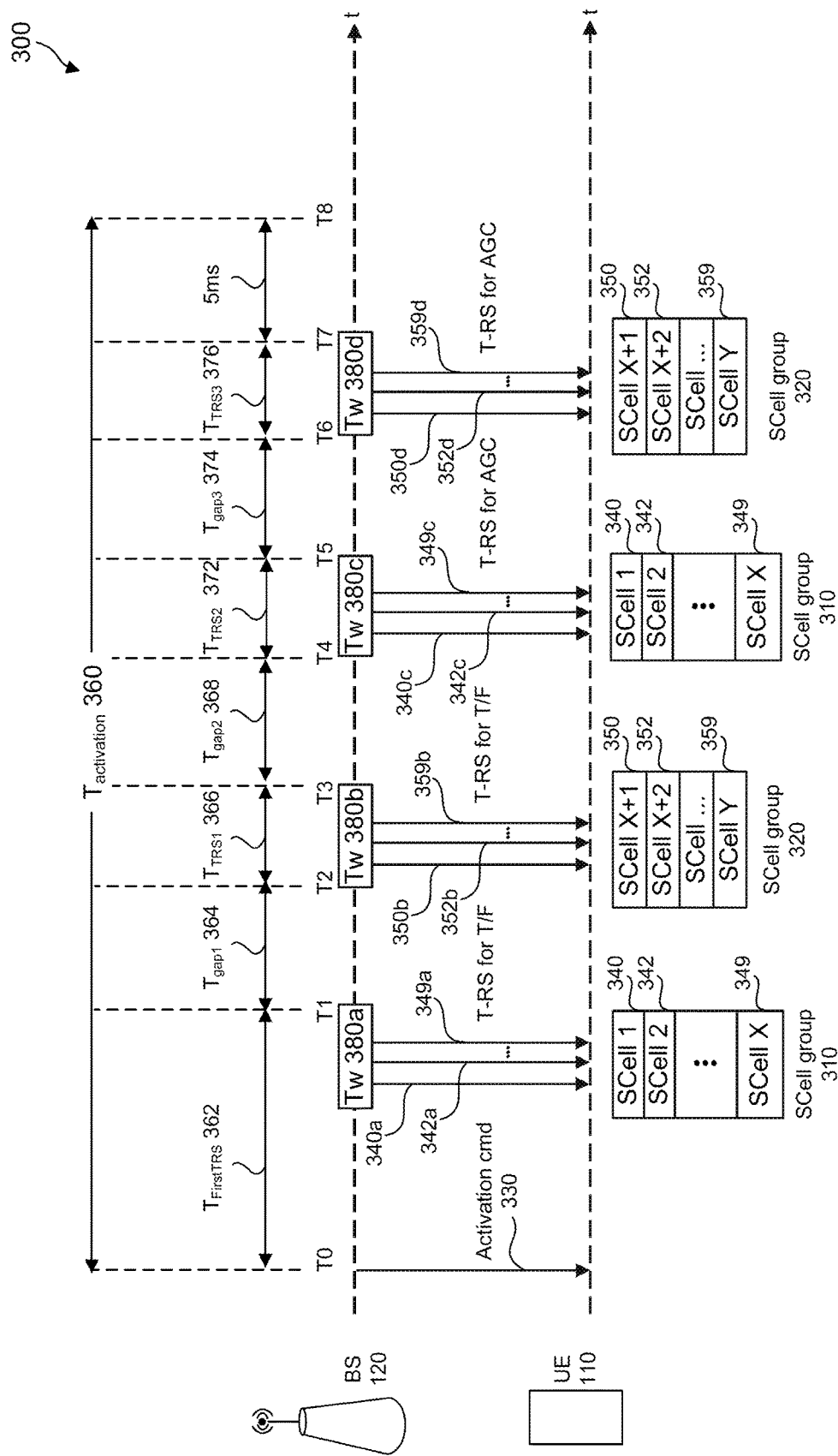
FIG. 3 illustrates a first example of simultaneous multiple SCell fast activation, according to some embodiments of the disclosure.

FIG. 3 illustrates example 300 of simultaneous multiple SCell fast activation, according to some embodiments of the disclosure. For explanation purposes and not a limitation, FIG. 3 may be described with reference to elements from other figures in the disclosure. For example, FIG. 3 may include UE 110 and BS 120 of FIG. 1. In example 300, T-RSs are transmitted for fast activation of target SCells. Example 300 includes two SCell groups: SCell group 310 and SCell group 320. SCell group 310 includes X SCells and SCell group 320 includes (Y−X) SCells. For example, if Y=9 and X=5 then SCell group 310 includes 5 SCells and SCell group 320 includes 4 SCells (e.g., 9 SCells−5 SCells=4 SCells.)

In example 300, UE 110 can include a parameter that identifies X SCells for which UE 110 can support using T-RS for fine T/F tracking and/or AGC adjustments simultaneously. For example, a physical layer parameter, maxTFtrackAGCforSCells=X. In some embodiments, SCells of SCell group 310 and SCell group 320 are activated after receiving T-RSs in various window lengths, Tw 380, as shown by $T_{activation}$ 360. In some embodiments, a subset of SCells of SCell group 310 and/or SCell group 320 can be activated before the remaining SCells of SCell group 310 and/or the remaining SCells of SCell group 320 are activated.

In example 300, BS 120 can transmit up to X T-RSs corresponding to X SCells of SCell group 310 within window length Tw 380a. The X T-RS 340a, 342a, through 349a correspond to SCells 340, 342, through 349 of SCell group 310. For the remaining (Y−X) SCells of SCell group 320, BS 120 can transmit corresponding (Y−X) T-RSs within window length Tw 380b. The (Y−X) T-RS 350b, 352b, through 359b correspond to SCells 350, 352, through 359 of SCell group 320.

In some embodiments, UE 110 can perform fine T/F tracking and/or AGC adjustments based on the received X T-RSs received corresponding to SCell group 310 and correspondingly on the received (Y−X) T-RSs received corresponding to SCell group 320. In some examples, UE 110 can simultaneously perform fine T/F tracking and/or AGC adjustments based on up to X T-RSs received corresponding to X SCells of SCell group 310. In some examples, UE 110 can simultaneously perform fine T/F tracking and/or AGC adjustments based on up to (Y−X) T-RSs received corresponding to (Y−X) SCells of SCell group 320.

In example 300, UE 110 performs fine T/F tracking based on: the X T-RSs received during Tw 380a and the (Y−X) T-RSs received during Tw 380b. UE 110 can perform AGC adjustments based on: the X T-RSs received during Tw 380c and the (Y−X) T-RSs received during Tw 380d. As shown in example 300, UE 110 can receive additional T-RSs to complete activation of the SCells of SCell group 310 and SCell group 320. For example, BS 120 can transmit another X T-RSs corresponding to X SCells of SCell group 310 within window length Tw 380c. The X T-RS 340c, 342c, through 349c correspond to SCells 340, 342, through 349 of SCell group 310. For the remaining (Y−X) SCells of SCell group 320, BS 120 can transmit corresponding (Y−X) T-RSs within window length Tw 380d. The (Y−X) T-RS 350d, 352d, through 359d correspond to SCells 350, 352, through 359 of SCell group 320.

In some embodiments (not shown), UE 110 can perform fine T/F tracking and/or AGC adjustments based on: the X T-RSs received during Tw 380a and the (Y−X) T-RSs received during Tw 380b.

In some examples, UE 110 can complete activation for some SCells (e.g., a subset of the X SCells of SCell group 310) earlier than other SCells (e.g., the remaining SCells of the X SCells of SCell group 310). Thus, UE 110 can report valid CQI for the corresponding subset of the X SCells so that the network can timely schedule usage of the subset of the X SCells earlier than the remaining SCells of the X SCells of SCell group 310. In some examples, UE 110 can report valid CQI for a corresponding subset of the (Y−X) SCells of SCell group 320 so that the network can timely schedule usage of the subset of the (Y−X) SCells earlier than the remaining SCells of the (Y−X) SCells of SCell group 320.

In some embodiments, $T_{activation}$ 360 indicates the time delay after which SCells in SCell group 310 and SCell group 320 are activated. $T_{activation}$ 360 can include $T_{FirstTRS}$ 362 $T_{gap1}$ 364+$T_{TRS1}$ 366+$T_{gap2}$ 368+$T_{TRS2}$ 372+$T_{gap3}$ 374+$T_{TRS3}$ 376+5 ms. A $T_{gap}$ can be greater than or equal to $T_{guard}$. As the $T_{TRS}$ are aperiodic and UE specific, the simultaneous activation of SCells within SCell group 310 and SCell group 320 after $T_{activation}$ 360 occurs faster than corresponding SCell activations via STMC. Activation delay may be described in 3GPP TS38.133 Section 8.3.2.

Figure 4:
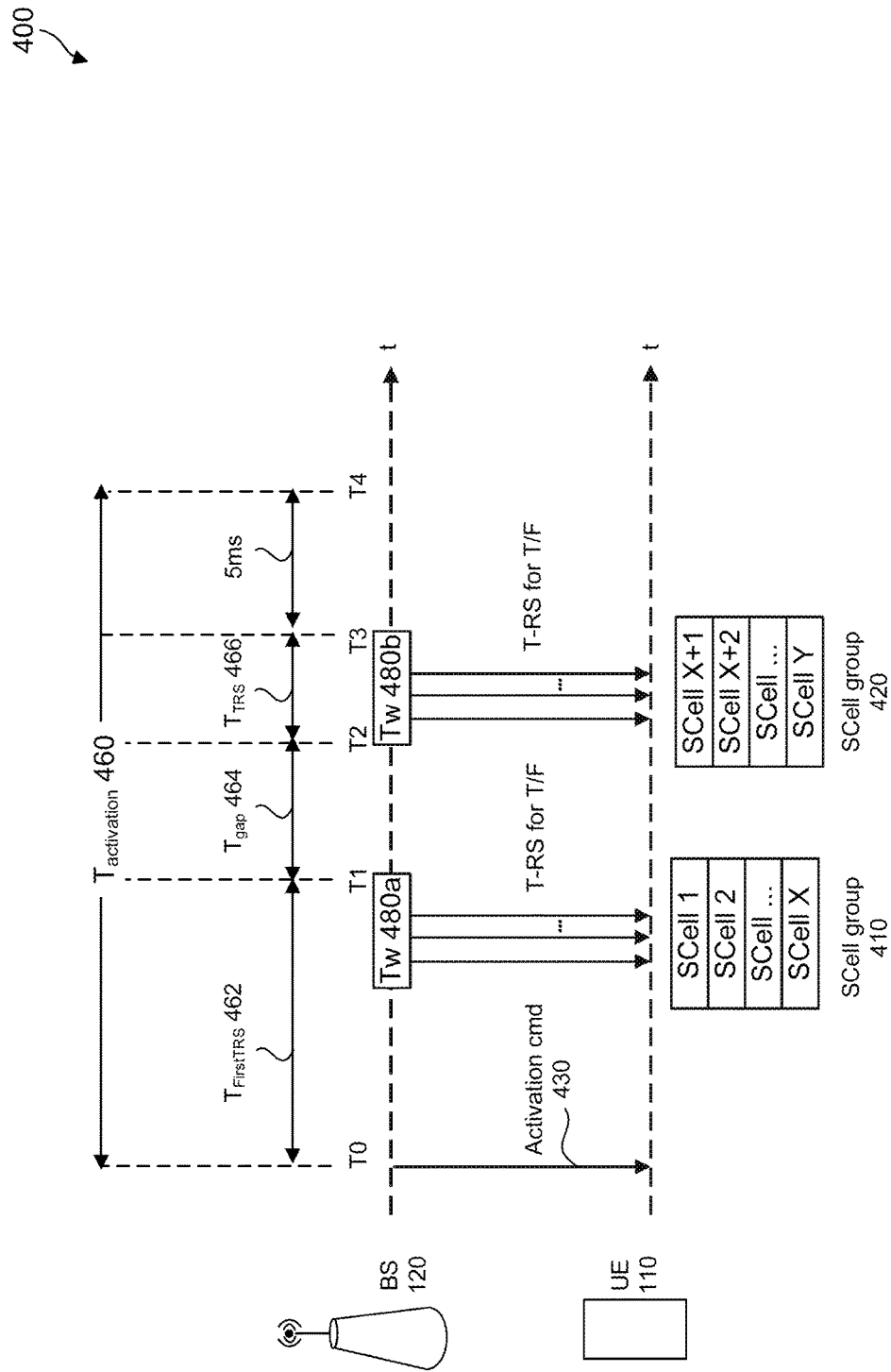
FIG. 4 illustrates a second example of simultaneous multiple SCell fast activation, according to some embodiments of the disclosure.

In some embodiments, when the SCell is known and belongs to Frequency Range 1 (FR1), the measurement period of the SCell being activated (e.g., the measurement period for each of the SCells in SCell group 410 and SCell group 420 of FIG. 4) is equal to or smaller than 2400 ms. The measurement period refers to the L3 Radio Resource Management (RRM) measurement on the Secondary Component Carrier (SCC), which is used as one of the conditions to determine which set of requirements apply. Some embodiments for simultaneous multiple SCell fast activations include the following:

When Y<=X: $T_{activation}$=$T_{FirstTRS}$ 5 ms where $T_{FirstTRS}$ can be the time after receiving an activation command to the end of a window length, Tw where the Y T-RSs are received. $T_{TRS}$ (e.g., Tw) can be the CSI-RS burst for SCell activation where the CSI-RS burst is defined as four CSI-RS resources in two consecutive slots.

When X<Y<=2X: $T_{activation}=T_{FirstTRS}+T_{gap}+T_{TRS}+5$ ms, where $T_{gap}$ is a gap length between two aperiodic Channel-State Information (CSI)-Reference Signal (RS) CSI-RS bursts. $T_{gap}>=T_{guard}$. $T_{TRS}$ can be the CSI-RS burst for SCell activation where the CSI-RS burst is defined as four CSI-RS resources in two consecutive slots.

When 2X<Y<=3X: $T_{activation}=T_{FirstTRS}+T_{gap1}+T_{TRS1}+T_{gap2}+T_{TRS2}+5$ ms.

FIG. 4 illustrates example 400 of simultaneous multiple SCell fast activation, according to some embodiments of the disclosure. For explanation purposes and not a limitation, FIG. 4 may be described with reference to elements from other figures in the disclosure. For example, FIG. 4 may include UE 110 and BS 120 of FIG. 1. In example 400, T-RSs are transmitted for fast activation of target SCells. Unlike example 300 of FIG. 3, in example 400, UE 110 does not need to perform AGC adjustments again since the target SCells (e.g., the measurement period for each of the SCells in SCell group 410 and SCell group 420 of FIG. 4) has been measured recently, (e.g., the measurement period of L3 RRM on the SCC is less than 2400 ms).

In example 400, the SCells are known and belong to FR1, and the measurement period of the SCell being activated (e.g., the measurement period for each of the SCells in SCell group 410 and SCell group 420 of FIG. 4) is less than or equal to 2400 ms. Example 400 includes two SCell groups: SCell group 410 and SCell group 420. SCell group 410 includes X SCells and SCell group 320 includes (Y–X) SCells where X<Y<=2X, where X and Y are integers. For example, if Y=10 and X=5 then SCell group 410 includes 5 SCells and SCell group 320 includes 5 SCells (e.g., 10 SCells–5 SCells=5 SCells.)

In example 400, UE 110 can include a parameter that identifies X SCells for which UE 110 can support using T-RS for fine T/F tracking and/or AGC adjustments simultaneously. The parameter can be for example, a physical layer parameter, maxTFtrackAGCforSCells=X. In some embodiments, SCells of SCell group 410 and SCell group 420 are correspondingly activated after receiving T-RSs in one window length, Tw 480, as shown by $T_{activation}$ 460.

In example 400, BS 120 can transmit up to X T-RSs corresponding to X SCells of SCell group 410 within window length Tw 480a. For the remaining (Y–X) SCells of SCell group 420, BS 120 can transmit corresponding (Y–X) T-RSs within window length Tw 480b. In some embodiments, UE 110 can perform fine T/F tracking based on the received X T-RSs received corresponding to SCell group 410 and correspondingly on the received (Y–X) T-RSs received corresponding to SCell group 420.

In some examples, UE 110 can complete activation for some SCells (e.g., a subset of the X SCells of SCell group 410) earlier than other SCells (e.g., the remaining SCells of the X SCells of SCell group 410). Thus, UE 110 can report valid CQI for the corresponding subset of the X SCells so that the network can timely schedule usage of the subset of the X SCells earlier than the remaining SCells of the X SCells of SCell group 410. In some examples, UE 110 can report valid CQI for a corresponding subset of the (Y–X) SCells of SCell group 420 so that the network can timely schedule usage of the subset of the (Y–X) SCells earlier than the remaining SCells of the (Y–X) SCells of SCell group 420.

In some embodiments, $T_{activation}$ 460 indicates the time delay after which SCells in SCell group 410 and SCell group 420 are activated. $T_{activation}$ 460 can include $T_{FirstTRS}$ 462+$T_{gap}$ 464+$T_{TRS}$ 466+5 ms. A $T_{gap}$ can be greater than or equal to $T_{guard}$.

Figure 5:
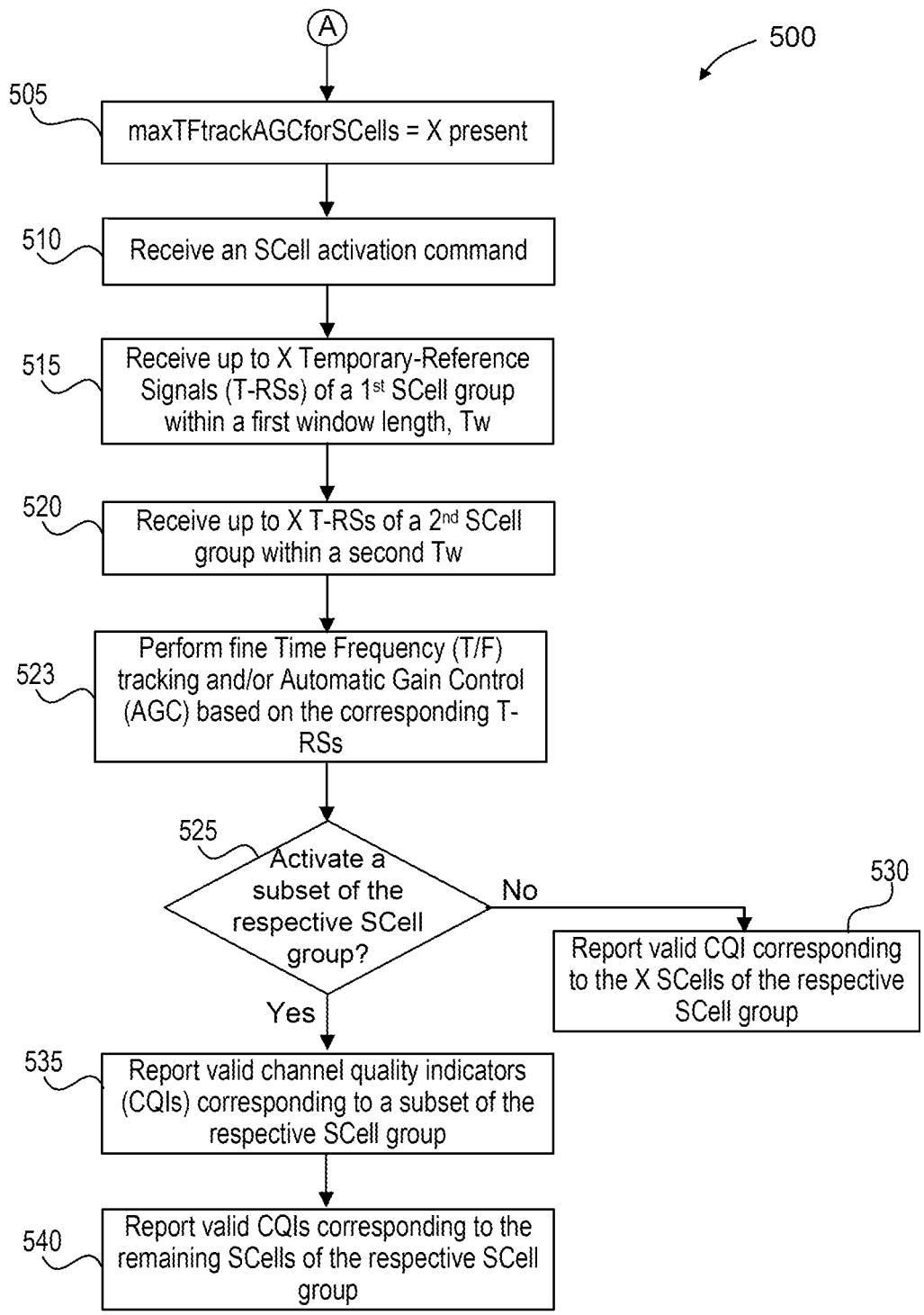
FIG. 5 illustrates a first method for an example user equipment (UE) supporting simultaneous multiple SCell fast activation when T-RSs are used for activating SCells, according to some embodiments of the disclosure.

FIG. 5 illustrates method 500 for an example UE supporting simultaneous multiple SCell fast activation when T-RSs are used for activating SCells, according to some embodiments of the disclosure. For explanation purposes and not a limitation, FIG. 5 may be described with reference to elements from other figures in the disclosure. For example, FIG. 5 may be performed by UE 110 of FIG. 1 or system 200 of FIG. 2.

At 505, UE 110 determines that maxTFtrackAGCforSCells=X present. For example, UE 110 can be configured with a physical layer parameter that indicates a maximum number of T-RSs for which fine T/F tracking and/or AGC adjustments can be made simultaneously.

At 510, UE 110 can receive an SCell activation command from BS 120, for example.

At 515, UE 110 can receive up to X T-RSs of a 1st SCell group (e.g., SCell group 310 or 410) within a first window length, Tw (e.g., Tw 380a or 480a).

At 520, UE 110 can receive up to X T-RSs (e.g., Y–X T-RSs) of a 2nd SCell group (e.g., SCell group 320 or 420) within a second Tw (e.g., Tw 380b or 480b.)

At 523, UE 110 can perform fine Time T/F tracking and/or AGC based on the corresponding T-RSs.

At 525, UE 110 can determine whether to activate a subset of the respective SCell group. When a subset of the respective SCell group is to be activated, method 500 proceeds to 535. Otherwise, method 500 proceeds to 530.

At 535, UE 110 can report valid CQIs corresponding to the subset of the respective SCell group that has been activated to BS 120. Thus, the network corresponding to BS 120 can schedule usage of the subset of SCells earlier than the remaining SCells of the SCell group.

At 540, UE 110 can report valid CQIs corresponding to the remaining SCells of the respective SCell group to BS 120.

Returning to 530, UE 110 can report valid CQI corresponding to the X SCells of the respective SCell group. Accordingly, the X SCells of the respective SCell group (e.g., SCell group 310, 410) can be activated at substantially the same time. In some embodiments, UE 110 can report valid CQI corresponding to the (Y–X) SCells of the respective SCell group (e.g., SCell group 320, 420.)

Figure 7A:
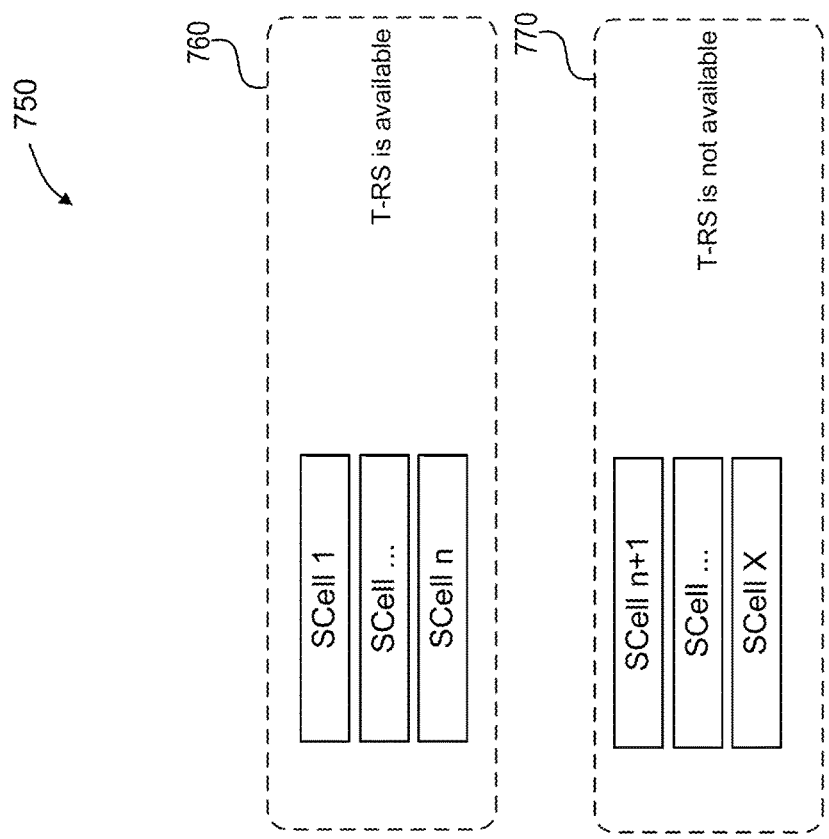
FIGS. 7A and 7B illustrate examples of simultaneous multiple SCell fast activation, according to some embodiments of the disclosure.

FIG. 7A illustrates example 700 of simultaneous multiple SCell fast activation, according to some embodiments of the disclosure. Example 700 illustrates multiple SCell 712 through SCell 715 operating in frequency band A 710. UE 110 may use T-RS for multiple SCell fast activation for SCell 712 through SCell 715. Example 700 also illustrates frequency band B 720 that includes active serving cell 725 that is contiguous in frequency to SCell 722 and SCell 726. In some examples, UE 110 may not use T-RSs for SCell activation in frequency band B 720. Instead, UE 110 may utilize SMTC and/or active serving cell 725 (e.g., for intraband contiguous carrier aggregation) to perform SCell activation for SCell 722 and SCell 726.

Figure 7B:
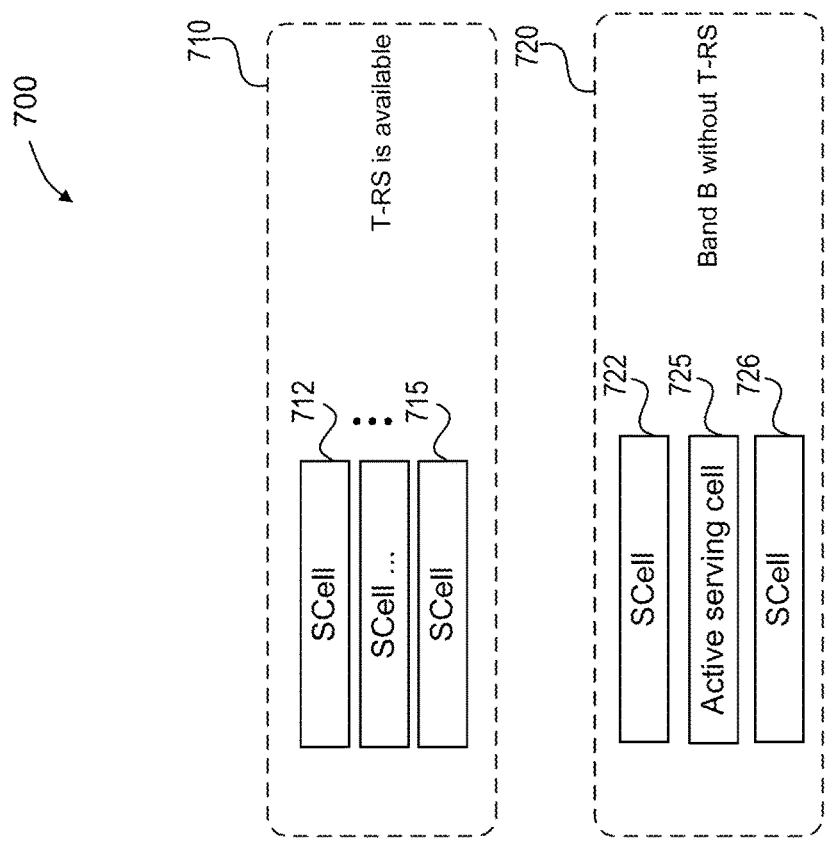

FIG. 7B illustrates example 750 of simultaneous multiple SCell fast activation, according to some embodiments of the disclosure. Example 750 illustrates two frequency bands, frequency band 760 and frequency band 770, without a contiguous active serving cell. In some embodiments, UE 110 can be configured to utilize T-RS in band 760, but not utilize T-RS in band 770. Consequently, SCells in band 770 may utilize SMTC for SCell activation (e.g., SSB can be used for fine T/F tracking and AGC adjustments) as described in 3GPP TS38.133.

Figure 6:
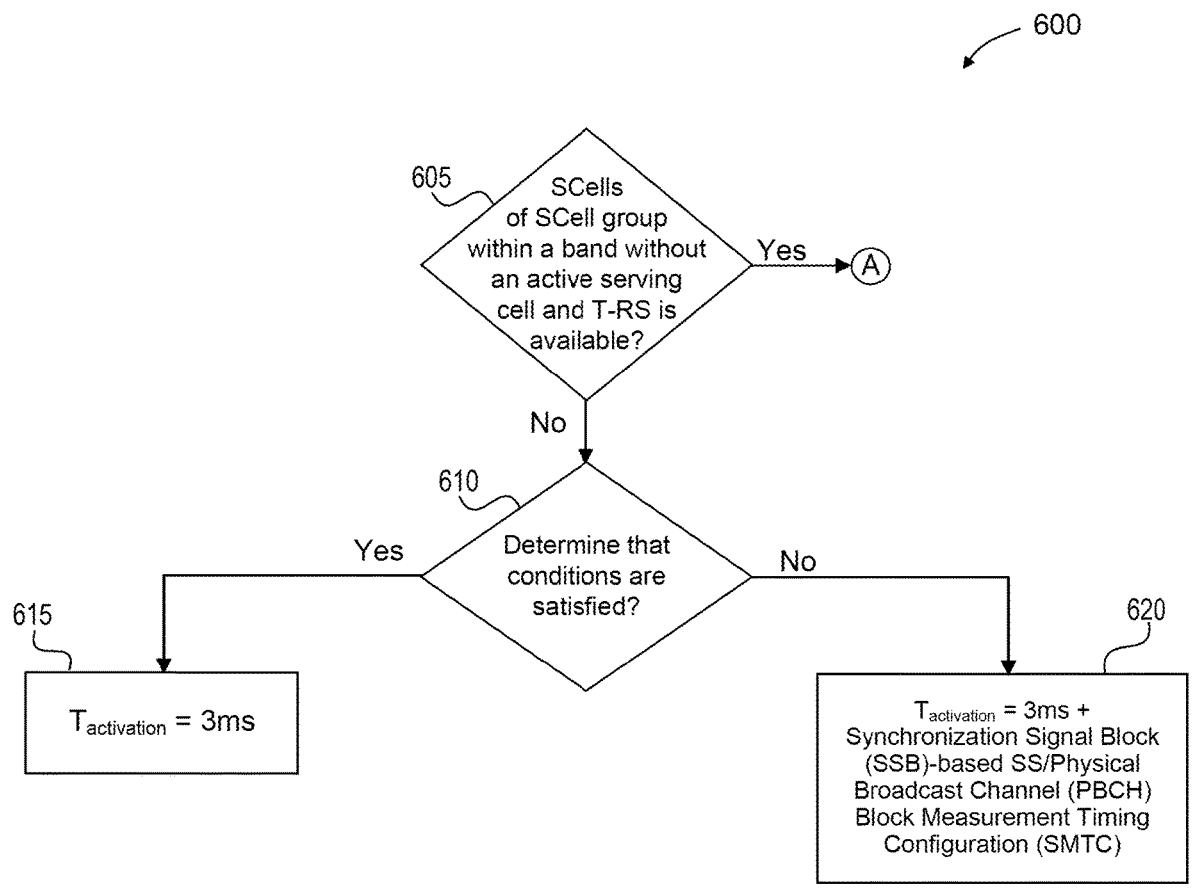
FIG. 6 illustrates a second method for an example UE supporting simultaneous multiple SCell fast activation, according to some embodiments of the disclosure.

FIG. 6 illustrates method 600 for an example UE supporting simultaneous multiple SCell fast activation, according to some embodiments of the disclosure. For explanation purposes and not a limitation, FIG. 6 may be described with reference to elements from other figures in the disclosure. For example, FIG. 6 may be performed by UE 110 of FIG. 1 or system 200 of FIG. 2 for simultaneous multiple SCell fast activation of SCells in frequency band A 710 of FIG. 7A and/or frequency band 760 of FIG. 7B.

At 605, UE 110 determines whether SCells of a first SCell group are within a band without an active serving cell and T-RS is available. When the SCells are within a band without an active serving cell and T-RS is available (e.g., frequency band A 710 or frequency band 760), method 600 proceeds to A and performs method 500 of FIG. 5. Otherwise, method 600 proceeds to 610.

At 610, for SCells being activated on bands with a contiguous active serving cell (e.g., SCell 722 contiguous in frequency to active serving cell 725, SCell 726 contiguous in frequency to active serving cell 725), UE 110 determines whether certain conditions are satisfied to select a corresponding $T_{activation}$ value for respective target SCell activation. In some embodiments, UE 110 determines whether the following certain conditions are satisfied:
  i) UE 110 is not provided with SSB configuration (e.g., absoluteFrequencySSB) or SMTC configuration for a target SCell;
  ii) the round trip delay (RTD) between the target SCell (e.g., SCell 722 or SCell 726 of frequency band B 720) and the contiguous active serving cell (e.g., active serving cell 725) is within ±260 ns;
  iii) the difference of a reception power of the target SCell compared with the contiguous active serving cell is <=6 dB; and
  iv) the reference signal (RS) of a target SCell (e.g., SCell 722 or SCell 726) being activated on the same band (e.g., frequency band B 720) is QCL-TypeA with Tracking Reference Signal (TRS), and the TRS of the target SCell being activated (e.g., SCell 722 or SCell 726) is QCL-TypeC with SSB(s) of the active serving cell (e.g., active serving cell 725) that is contiguous to the target SCell (e.g., SCell 722 or SCell 726) being activated on that FR1 band.

When the conditions i) through iv) above are satisfied, method 600 proceeds to 615. Otherwise, method 600 proceeds to 620.

At 615, $T_{activation}$=3 ms. For example, the activation time delay for an SCell being activated on a band where there is at least one active contiguous serving cell is 3 ms.

At 620, when one or more of the conditions are not satisfied, $T_{activation}$=3 ms+SMTC.

Figure 8:
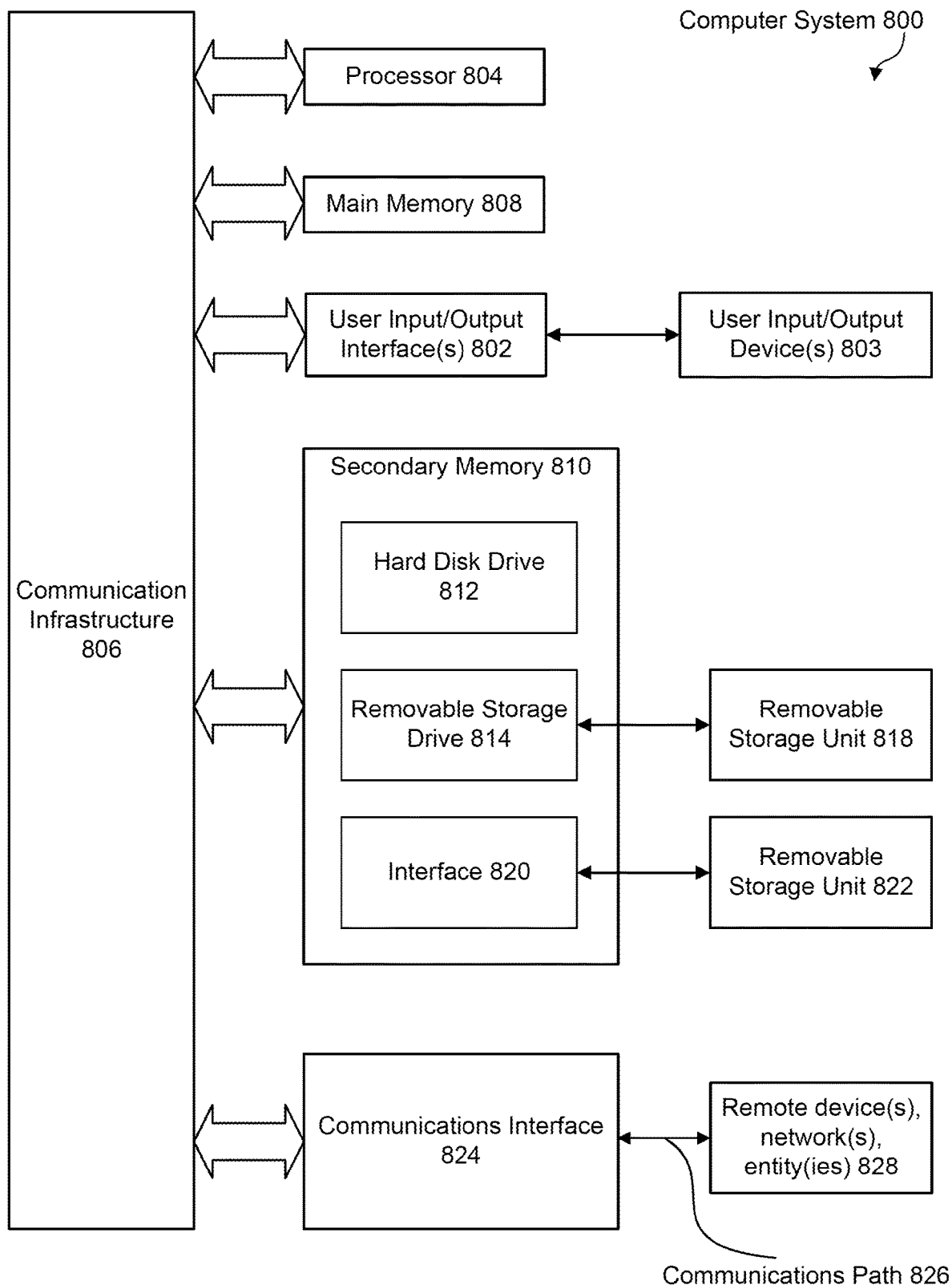
FIG. 8 is an example computer system for implementing some embodiments or portion(s) thereof.

Various embodiments can be implemented, for example, using one or more well-known computer systems, such as computer system 800 shown in FIG. 8. Computer system 800 can be any well-known computer capable of performing the functions described herein. For example, and without limitation, BS 120 and/or UE 110 of FIG. 1, system 200 of FIG. 2, example 300 of FIG. 3, example 400 of FIG. 4, method 500 of FIG. 5, method 600 of FIG. 6, and examples 700 and 760 of FIGS. 7A and 7B (and/or other apparatuses and/or components shown in the figures) may be implemented using computer system 800, or portions thereof.

Computer system 800 includes one or more processors (also called central processing units, or CPUs), such as a processor 804. Processor 804 is connected to a communication infrastructure 806 that can be a bus. One or more processors 804 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 800 also includes user input/output device(s) 803, such as monitors, keyboards, pointing devices, etc., that communicate with communication infrastructure 806 through user input/output interface(s) 802. Computer system 800 also includes a main or primary memory 808, such as random access memory (RAM). Main memory 808 may include one or more levels of cache. Main memory 808 has stored therein control logic (e.g., computer software) and/or data.

Computer system 800 may also include one or more secondary storage devices or memory 810. Secondary memory 810 may include, for example, a hard disk drive 812 and/or a removable storage device or drive 814. Removable storage drive 814 may be a floppy disk drive, a magnetic tape drive, a compact disk drive, an optical storage device, tape backup device, and/or any other storage device/drive.

Removable storage drive 814 may interact with a removable storage unit 818. Removable storage unit 818 includes a computer usable or readable storage device having stored thereon computer software (control logic) and/or data. Removable storage unit 818 may be a floppy disk, magnetic tape, compact disk, DVD, optical storage disk, and/any other computer data storage device. Removable storage drive 814 reads from and/or writes to removable storage unit 818 in a well-known manner.

According to some embodiments, secondary memory 810 may include other means, instrumentalities or other approaches for allowing computer programs and/or other instructions and/or data to be accessed by computer system 800. Such means, instrumentalities or other approaches may include, for example, a removable storage unit 822 and an interface 820. Examples of the removable storage unit 822 and the interface 820 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 800 may further include a communication or network interface 824. Communication interface 824 enables computer system 800 to communicate and interact with any combination of remote devices, remote networks, remote entities, etc. (individually and collectively referenced by reference number 828). For example, communication interface 824 may allow computer system 800 to communicate with remote devices 828 over communications path 826, which may be wired and/or wireless, and which may include any combination of LANs, WANs, the Internet, etc. Control logic and/or data may be transmitted to and from computer system 800 via communication path 826.

The operations in the preceding embodiments can be implemented in a wide variety of configurations and architectures. Therefore, some or all of the operations in the preceding embodiments may be performed in hardware, in software or both. In some embodiments, a tangible, non-transitory apparatus or article of manufacture includes a tangible, non-transitory computer useable or readable medium having control logic (software) stored thereon is also referred to herein as a computer program product or program storage device. This includes, but is not limited to, computer system 800, main memory 808, secondary memory 810 and removable storage units 818 and 822, as well as tangible articles of manufacture embodying any combination of the foregoing. Such control logic, when executed by one or more data processing devices (such as computer system 800), causes such data processing devices to operate as described herein.

Based on the teachings contained in this disclosure, it will be apparent to persons skilled in the relevant art(s) how to make and use embodiments of the disclosure using data processing devices, computer systems and/or computer architectures other than that shown in FIG. 8. In particular, embodiments may operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more but not all exemplary embodiments of the disclosure as contemplated by the inventor(s), and thus, are not intended to limit the disclosure or the appended claims in any way.

While the disclosure has been described herein with reference to exemplary embodiments for exemplary fields and applications, it should be understood that the disclosure is not limited thereto. Other embodiments and modifications thereto are possible, and are within the scope and spirit of the disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. In addition, alternative embodiments may perform functional blocks, steps, operations, methods, etc. using orderings different from those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the disclosure should not be limited by any of the above-described exemplary embodiments, but should be defined only in accordance with the following claims and their equivalents.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should only occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of, or access to, certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

What is claimed is:

1. A user equipment (UE) comprising:
a transceiver; and
a processor coupled to the transceiver, configured to:
  receive an activation command;
  subsequent to the activation command, receive a first group of X temporary reference signals (T-RSs) within a first window length (Tw), where X is an integer, wherein the first group of X T-RSs are specific to the UE;
  activate a first group of secondary cells (SCells), wherein a first SCell of the first group of SCells corresponds respectively to a first T-RS of the first group of X T-RSs;
  subsequent to the first Tw and a first gap period, $T_{gap1}$, receive (Y–X) T-RSs that are specific to the UE within a second Tw, where Y is an integer greater than X and where (Y–X) is less than X; and
  activate a second group of SCells, wherein one SCell of the second group of SCells corresponds to one T-RS of the (Y–X) T-RSs, wherein the second group of SCells is different from the first group of SCells.

2. The UE of claim 1, wherein the first Tw corresponds to multiple slots.

3. The UE of claim 2, wherein the multiple slots corresponds to 2 slots.

4. The UE of claim 1, wherein an activation time, $T_{activation}$, for activating the first and the second group of SCells comprises a $T_{FirstTRS}$, the $T_{gap1}$, the second Tw, a $T_{SecondTRS}$, a $T_{gap2}$, and a third Tw, wherein the $T_{FirstTRS}$ comprises a time after the activation command is received to an end of the first Tw.

5. The UE of claim 1, wherein the processor is further configured to:
  simultaneously activate a subset of SCells of the first group of SCells before remaining SCells of the first group of SCells; and report first valid channel quality indicators (CQIs) corresponding to the subset of SCells before reporting second valid CQIs corresponding to the remaining SCells of the first group of SCells.

6. The UE of claim 1, wherein to activate the first group of SCells, the processor is configured to:
receive a second group of X T-RSs within a third Tw, wherein the second group of X T-RSs corresponds to the first group of SCells; and
perform one or more automatic gain control (AGC) adjustments based at least on the second group of X T-RSs.

7. A method of operating a user equipment (UE) comprising:
receiving an activation command;
subsequent to the activation command, receiving X temporary reference signals (T-RSs) within a first window length (Tw) where X is an integer, wherein the X T-RSs are specific to the UE;
activating a first group of secondary cells (SCells), wherein a first SCell of the first group of SCells corresponds respectively to a first T-RS of the X T-RSs;
subsequent to the first Tw and a first gap period, $T_{gap1}$, receiving (Y–X) T-RSs that are specific to the UE within a second Tw, where Y is an integer greater than X and less than or equal to 2X; and
activating a second group of SCells, wherein one SCell of the second group of SCells corresponds to one T-RS of the (Y–X) T-RSs, wherein the second group of SCells is different from the first group of SCells.

8. The method of claim 7, wherein the activating the first group of SCells comprises simultaneously performing fine Time/Frequency (T/F) tracking on the first group of SCells based at least on the X T-RSs.

9. The method of claim 7, wherein the receiving the X T-RSs comprises the UE using a parameter, wherein the parameter comprises maxTFtrackAGCforSCells=X.

10. The method of claim 7, wherein the first Tw corresponds to multiple slots, and wherein the multiple of slots correspond to 2 slots.

11. The method of claim 7, wherein an activation time, $T_{activation}$, for activating the first and the second group of SCells comprises a $T_{FirstTRS}$, the $T_{gap1}$, and the second Tw, wherein the $T_{FirstTRS}$ comprises a time after the activation command is received to an end of the first Tw.

12. The method of claim 7, further comprising:
simultaneously activating a subset of SCells of the first group of SCells before remaining SCells of the first group of SCells; and
reporting first valid channel quality indicators (CQIs) corresponding to the subset of SCells before reporting second valid CQIs corresponding to the remaining SCells of the first group of SCells.

13. A non-transitory computer-readable medium storing instructions that, when executed by a processor of a user equipment (UE), cause the UE to perform operations, the operations comprising:
receiving an activation command;
subsequent to the activation command, receiving X temporary reference signals (T-RSs) within a first window length (Tw) where X is an integer, wherein the X T-RSs are specific to the UE;
activating a first group of secondary cells (SCells), wherein a first SCell of the first group of SCells corresponds respectively to a first T-RS of the X T-RSs;
subsequent to the first Tw and a first gap period, $T_{gap1}$, receiving (Y–X) T-RSs that are specific to the UE within a second Tw, where Y is an integer greater than X and where (Y–X) is less than X; and
activating a second group of SCells, wherein one SCell of the second group of SCells corresponds to one T-RS of the (Y–X) T-RSs, wherein the second group of SCells is different from the first group of SCells.

14. The non-transitory computer-readable medium of claim 13, wherein an activation time, $T_{activation}$, for activating the first and the second group of SCells comprises a $T_{FirstTRS}$, the $T_{gap1}$, the second Tw, a $T_{SecondTRS}$, a $T_{gap2}$, and a third Tw, wherein the $T_{FirstTRS}$ comprises a time after the activation command is received to an end of the first Tw.

15. The non-transitory computer-readable medium of claim 13, wherein the operations further comprise:
simultaneously activating a subset of SCells of the first group of SCells before remaining SCells of the first group of SCells; and
reporting first valid channel quality indicators (CQIs) corresponding to the subset of SCells before reporting second valid CQIs corresponding to the remaining SCells of the first group of SCells.

16. The UE of claim 1, wherein to activate the first group of SCells, the processor is configured to simultaneously perform fine Time/Frequency (T/F) tracking on the first group of SCells based at least on the X T-RSs.

17. The UE of claim 1, wherein to receive the X T-RSs, the processor is further configured to use a parameter, wherein the parameter comprises maxTFtrackAGCforSCells=X.

18. The non-transitory computer-readable medium of claim 13, wherein the activating the first group of SCells comprises simultaneously performing fine Time/Frequency (T/F) tracking on the first group of SCells based at least on the X T-RSs.

19. The non-transitory computer-readable medium of claim 13, wherein the receiving the X T-RSs comprises the UE using a parameter, wherein the parameter comprises maxTFtrackAGCforSCells=X.

20. The non-transitory computer-readable medium of claim 13, wherein the first Tw corresponds to multiple slots, and wherein the multiple of slots correspond to 2 slots.

* * * * *